(12) United States Patent
Aitkenhead et al.

(10) Patent No.: US 7,008,366 B1
(45) Date of Patent: Mar. 7, 2006

(54) CIRCUMFERENTIALLY DRIVEN CONTINUOUS FLOW CENTRIFUGE

(75) Inventors: William Aitkenhead, Sharon, MA (US); Glen Jorgensen, Marlboro, MA (US); Robert L. Standley, Brighton, MA (US)

(73) Assignee: ZymeQuest, Inc., Beverly, MA (US)

( * ) Notice: Subject to any disclaimer, the term of this patent is extended or adjusted under 35 U.S.C. 154(b) by 0 days.

(21) Appl. No.: 10/111,368

(22) PCT Filed: Oct. 27, 2000

(86) PCT No.: PCT/US00/29705

§ 371 (c)(1),
(2), (4) Date: Dec. 19, 2002

(87) PCT Pub. No.: WO01/30505

PCT Pub. Date: May 3, 2001

(51) Int. Cl.
*B04B 7/00* (2006.01)

(52) U.S. Cl. ............................. 494/18; 494/83; 138/111

(58) Field of Classification Search ............ 494/17–18, 494/21, 45, 83, 84; 210/380.1, 380.3, 781, 210/782; 138/111
See application file for complete search history.

(56) References Cited

U.S. PATENT DOCUMENTS

| | | | | | |
|---|---|---|---|---|---|
| 3,586,413 | A | * | 6/1971 | Adams | 494/18 |
| 4,018,304 | A | * | 4/1977 | Lolachi et al. | 494/18 |
| 4,109,852 | A | * | 8/1978 | Brown et al. | 494/84 |
| 4,111,356 | A | * | 9/1978 | Boggs et al. | 494/84 |
| 4,114,802 | A | * | 9/1978 | Brown | 494/18 |
| 4,120,448 | A | * | 10/1978 | Cullis | 494/43 |
| 4,163,519 | A | * | 8/1979 | Stabile | 494/18 |
| 4,164,318 | A | * | 8/1979 | Boggs | 494/18 |
| 4,221,322 | A | * | 9/1980 | Drago et al. | 494/84 |
| 4,372,484 | A | * | 2/1983 | Larsson et al. | 494/14 |
| 4,389,206 | A | * | 6/1983 | Bacehowski et al. | 494/42 |
| 4,425,112 | A | * | 1/1984 | Ito | 494/45 |
| 4,439,178 | A | * | 3/1984 | Mulzet | 494/85 |
| 4,453,898 | A | * | 6/1984 | Leka et al. | 417/521 |
| 4,459,169 | A | * | 7/1984 | Bacehowski et al. | 156/221 |
| 4,710,161 | A | * | 12/1987 | Takabayashi et al. | 494/84 |
| 4,865,081 | A | * | 9/1989 | Neumann et al. | |
| 5,501,840 | A | * | 3/1996 | Mantovani et al. | 422/101 |
| 5,514,069 | A | * | 5/1996 | Brown et al. | 494/18 |
| 5,665,048 | A | * | 9/1997 | Jorgensen | 494/18 |
| 5,704,887 | A | * | 1/1998 | Slowik et al. | 494/12 |
| 5,989,177 | A | * | 11/1999 | West et al. | 494/46 |
| 6,059,117 | A | * | 5/2000 | Novak et al. | 209/10 |

(Continued)

*Primary Examiner*—Charles E. Cooley
(74) *Attorney, Agent, or Firm*—Foley & Lardner LLP; Michel Morency; John M. Garvey (57) ABSTRACT

A centrifuge (10) including a first rotatable mechanism (60) having a rotation axis with a fluid retentive housing (20) being coaxially mounted on the first rotatable mechanism for co-rotation therewith; a second rotatable mechanism (90) having a rotation axis with the first and second rotatable mechanisms being coaxially interconnected for co-rotation around a common axis; and fluid tubing (70) connected to the axis of the fluid retentive housing and having a distal length that extends axially outwardly from the fluid retentive housing. A support arm (50) is mounted to the second rotatable mechanism, a support tube (80) receives therethrough at least a part of the distal length of the fluid tubing, and a bearing member (82) rotatably supports the support tube in the support arm, whereby upon rotation of the first and second rotatable mechanisms, the fluid tubing is free to one of rotate with and rotate relative to the support tube.

7 Claims, 6 Drawing Sheets

U.S. PATENT DOCUMENTS

6,273,849 B1 * 8/2001 Scherer ..................... 494/37
6,344,020 B1 * 2/2002 Reitz et al. .................. 494/46
6,419,073 B1 * 7/2002 Piron ..................... 198/370.03
6,716,154 B1 * 4/2004 Witthaus et al. ............. 494/83
6,832,981 B1 * 12/2004 Witthaus et al.

* cited by examiner

A CIRCUMFERENTIALLY DRIVEN
CONTINUOUS FLOW CENTRIFUGE

BACKGROUND OF THE INVENTION

The present invention relates to centrifuge apparati and more particularly to a centrifuge which works in conjunction with a cassette, rotor or other device having fluid retentive chambers and fluid flow tubing fixedly attached to the axis of the device.

In the context of mechanisms which have come to be known as continuous flow centrifuges, when a length of tubing is fixedly attached to the rotation axis of a device which contains the fluid material to be centrifuged, the entire length of tubing must be rotated by use of rotary seals or some other means to avoid twisting the tubing. A well known method for avoiding the use of rotary seals is to curve the length of tubing outwardly from the axis and around the outer edge of the circumference of the rotor, cassettes or the like and to rotate the tubing in an orbital fashion around the rotor/cassette at one-half times the rotational speed of the rotor/cassette itself. Such a method for eliminating tube twisting and apparati therefore are disclosed, for example, in U.S. Pat. Nos. 4,216,770, 4,419,089 and 4,389,206.

Problems inherent in such prior apparatuses which orbit the fluid flow tubing around the axis of centrifuge rotation are that the axis of rotation is disposed vertically, the tubing is routed through an axial shaft and the apparatus is driven by driving an axial shaft which requires a high aspect ratio and an elongated shaft which limit the rotational speed, render the apparatus instable and limits the ability of the user to mount a second cassette, rotor or the like on opposing sides of the chuck component of the apparatus.

In accordance with the foregoing, reference is also made to U.S. Pat. No. 5,665,048 that provides a centrifuge for rotating a fluid retentive housing having fluid input and output tubing fixedly connected to a rotation axis of the fluid retentive housing, the centrifuge comprising: a frame; a first rotatable mechanism having a rotation axis, the fluid retentive housing being coaxially mounted thereon for co-rotation therewith; a second rotatable mechanism having a rotation axis, the first and second rotation mechanism being coaxially mounted on the frame; the second rotatable mechanism having an outer circumferential surface engaged with a drive mechanism, the drive mechanism driving the outer circumferential surface such that the second rotatable mechanism rotates at a selected rotational speed X; the first rotatable mechanism being interconnected to the second rotatable mechanism such that the first rotatable mechanism rotates simultaneously with the second rotatable mechanism at a rotational speed of 2X.

The second rotatable mechanism includes a seat for holding a distal length of the output tubing which extends from the axis of the fluid retentive housing, wherein the distal length of the output tubing held by the seat is rotated around the rotation axis at the same rotational speed as the second rotatable mechanism. One of the problems associated with such an arrangement is that there is continuous friction between the tubing and the seat.

SUMMARY OF THE INVENTION

Therefore, in accordance with the present invention, there is provided an improvement in a centrifuge, and, in particular, an improvement relating to fluid tubing by the support thereof. In accordance with the present invention, there is provided a centrifuge for rotating a fluid retentive housing such that one or more selected materials suspended in a fluid retained within the housing centrifuged upon rotation of the housing. The centrifuge includes a first rotatable mechanism having a rotation access with the fluid retentive housing being coaxially mounted on the first rotatable mechanism for co-rotation therewith. There is also provided a second rotatable mechanism having a rotation axis with the first and second rotatable mechanisms being coaxially interconnected for co-rotation around a common axis. Fluid tubing connected to the axis of the fluid retentive housing has a distal length that extends axially outwardly from the fluid retentive housing. In accordance with one embodiment of the present invention, the improvement comprises a support arm mounted to the second rotatable mechanism, a support tube for receiving therethrough at least part of the distal length of the fluid tubing, and a bearing member for rotatably supporting the support tube in said support arm whereby upon rotation of the first and second rotation mechanisms, the fluid tubing is free to either rotate with or rotate relative to the support tube so as to minimize friction between the fluid tubing and the support therefor.

In accordance with another embodiment of the present invention, there is provided a multi-lumen rope comprising a plurality of elongated tubes for delivering one or more fluids between a first fluid containing mechanism and a fluid receiving rotatably driven rotor. One end of the rope is attached to the center of the driven rotor and the other end of the rope is attached to the first fluid retaining mechanism. The first fluid retaining mechanism is mounted on an opposing side of the rotor such that the point of attachment of the other end of the rope is substantially coaxial with an axis of the rotor. The aforementioned elongated tubes may comprise at least one tube disposed of in a spiral wrap. This may be either a single strand or a multi-strand wrap and may be either in a counterclockwise or clockwise direction. And also, in a single strand or a multi-strand, at one end the spiral wrap may be clockwise while at the other end counterclockwise and also optionally have a straight section therebetween.

DETAILED DESCRIPTION

Figure 1:
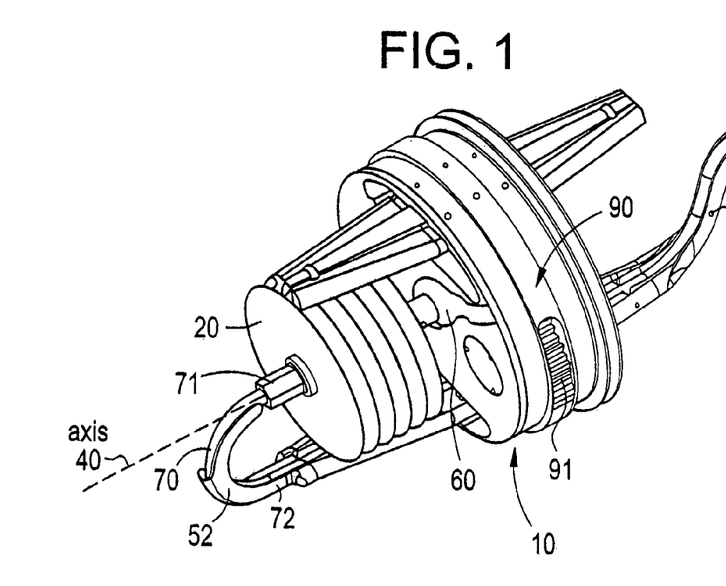
FIG. 1 is a perspective view of a centrifuge apparatus according to the invention.

FIG. 1 shows a centrifuge apparatus 10, the basic construction of which may be substantially the same as that described in U.S. Pat. No. 5,665,048. As far as the invention of the present invention is concerned, this relates more to the tubing 70, and, in particular, its support from the centrifuge apparatus 10. The support includes the support arm 50 as well as its guide members 52 and 54.

As indicated previously, the basic structure of the centrifuge apparatus 10 may be the same as that described in U.S.

Figure 3:
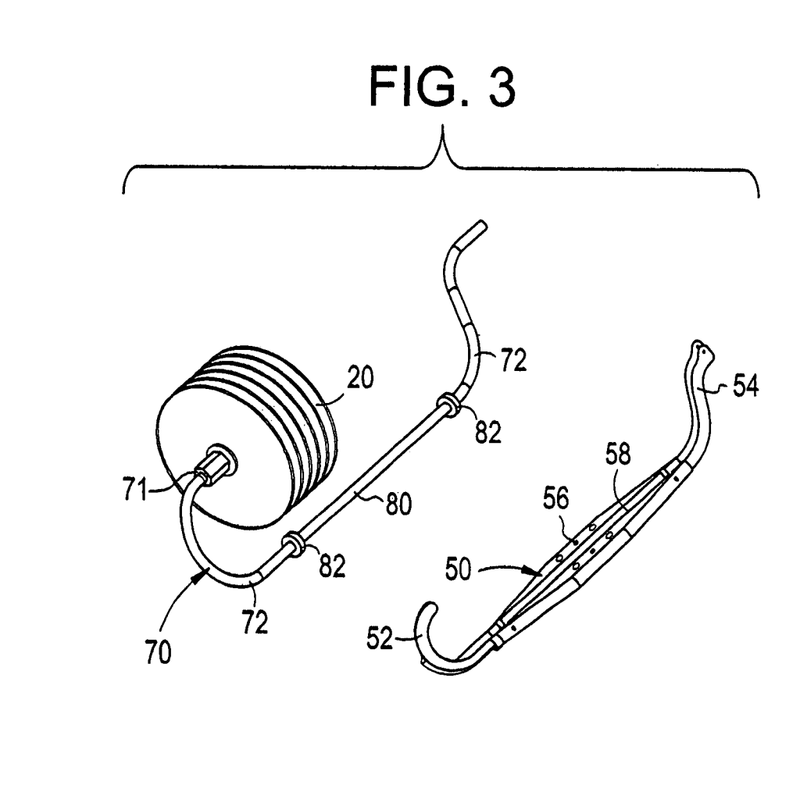
FIG. 3 is an exploded perspective view showing the support arm with end guides and the fluid retentive housing with fluid tubing.

Pat. No. 5,665,048. U.S. Pat. No. 5,665,048 is thus hereby now incorporated by reference herein. This apparatus includes a bag set 20. This may also be referred to as a self-contained fluid retentive centrifuge cassette or rotor which is mounted on an inner-rotatable chuck 60. The bag set 20, as illustrated in FIGS. 1 and 3, has fluid input and output 70 coaxially and fixedly attached to the axis 40 of the cassette 20. As shown, the cassette is mounted on the chuck 60 such that it's rotation axis is coaxial along common axis 40. Thus, as the chuck 60 rotates, the fixedly attached tubing 70 co-rotates therewith. As shown, there is a length 72 of the tubing 70 which extends axially outwardly from the area of the fixed attachment 71. The length 72 of tubing is curved axially backwardly toward and extends through a radially outer, separately rotatable pulley 90 which rotates, by virtue of a gear train interconnecting the pulley 90 and the chuck 60 at a speed of XRPM while the chuck rotates at a speed of 2XRPM. Again, reference is made to U.S. Pat. No. 5,665,048 which is incorporated by reference herein regarding the operation of the chuck and pulley arrangement. FIG. 1 actually shows the cutaway section indicating the chuck 60 and a further cutaway section showing a gear 91, part of the aforementioned gear train.

In operation, as the pulley 90 rotates, the backwardly curved length 72 of the tubing is rotated around axis 40 at a rate of XRPM while the fixedly attached end 71 of the tubing 70 is actually rotated at a rate of 2XRPM. This phenomenon is well known in the art as enabling the tubing 70 to avoid twisting around its axis even as the cassette 20 and the chuck 60 forced the tubing 70, 71 to be axially rotated. A fuller description of this phenomenon is described in U.S. Pat. No. 5,665,048 as well as in U.S. Pat. No. RE29,738 (U.S. Pat. No. 3,586,413) (Adams).

Figure 2:
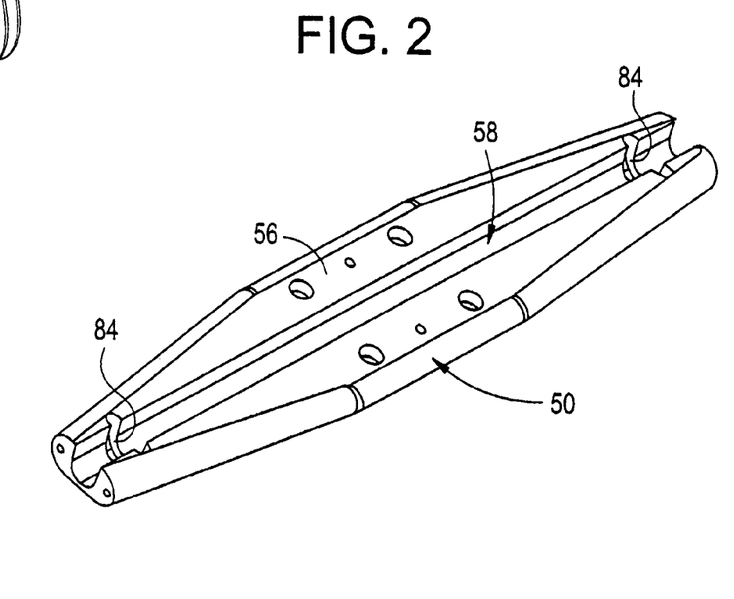
FIG. 2 is a perspective view of a portion of the apparatus of FIG. 1, particularly, the support arm.

Now, reference is further made to FIGS. 2 and 3 which illustrate the support arm 50. The support arm 50 at its central section 56, is fixedly attached to an inner-periphery of the pulley 90. Thus, the support arm 50 rotates with the Hub 90.

Figure 4:
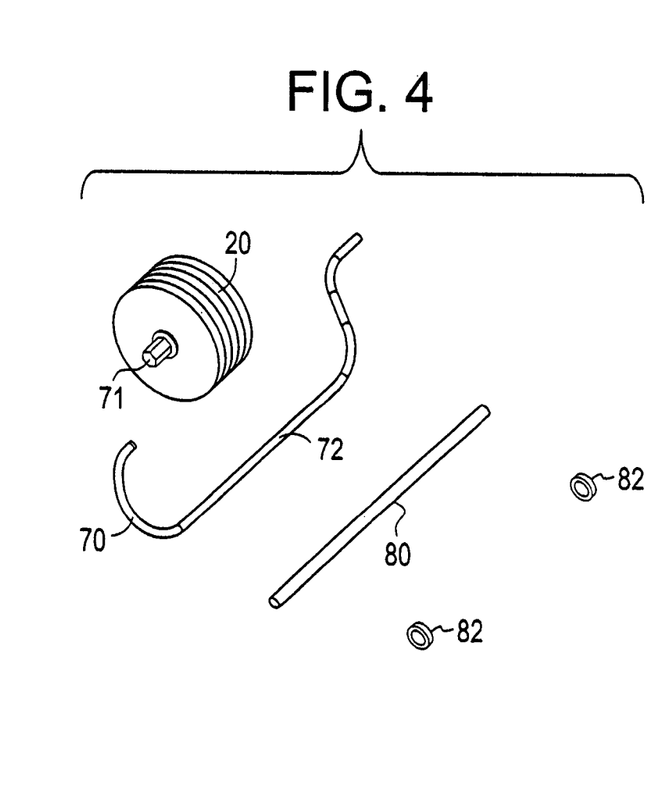
FIG. 4 is an exploded perspective view showing the components of the fluid retentive housing and fluid tubing.

The support arm 50 is of elongated shape and extends on either side of the centrifuge apparatus 10, as illustrated in FIG. 1. As illustrated in FIG. 2, the support arm 50 has an elongated channel 58 which receives the support tube 80. The support tube 80 is actually supported in the channel 58 by means of a pair of bearings 82 illustrated in FIGS. 3 and 4. Each of these bearings is accommodated in a corresponding recess 84 at opposite ends of the support arm, as illustrated in FIG. 2.

Thus, the support arm 50 is fixedly attached to the pulley 90, the support tube 80 is supported within the channel and support arm by means of bearings 82 and then the fluid tubing 70 extends through the support tube 80, but in this regard, FIG. 1 shows all of these various components in their final assembled state. The fluid tubing 70 is shown being guided by a C-shaped guide member 52 into one end of the support tube 80. At the other end of the support tube, the fluid tubing length 72 extends out of the support tube and into the S-shaped tubing guide 54, as also illustrated in FIG. 1.

When the fluid tubing is in the form of a multi-lumen rope, embodiments of which will be described hereinafter, the elements of the rope furthest from the axis of rotation exert large forces against the supporting surface and consequently produce large frictional forces impeding the twists required to make the slip rope function. It has been found that the following perimeters are desirable for proper operation of a multi-lumen skip rope;

1) strong but flexible skip rope assembly;
2) ability to transmit torque without damage to the rope;
3) low friction between rope and supports particularly far from the rotational axis where the g-field is high.

Parameters 1 and 2 are generally met by selecting relatively small diameter, high durometer thermoplastic tubing. Gluing methods and fixtures were used so that an assembly of at least 9 lumens could be well fabricated with very uniform tubing lay and therefore stiffness and strength. This assembly is of a spiral wrapped construction to improve uniformity.

Figure 5A:
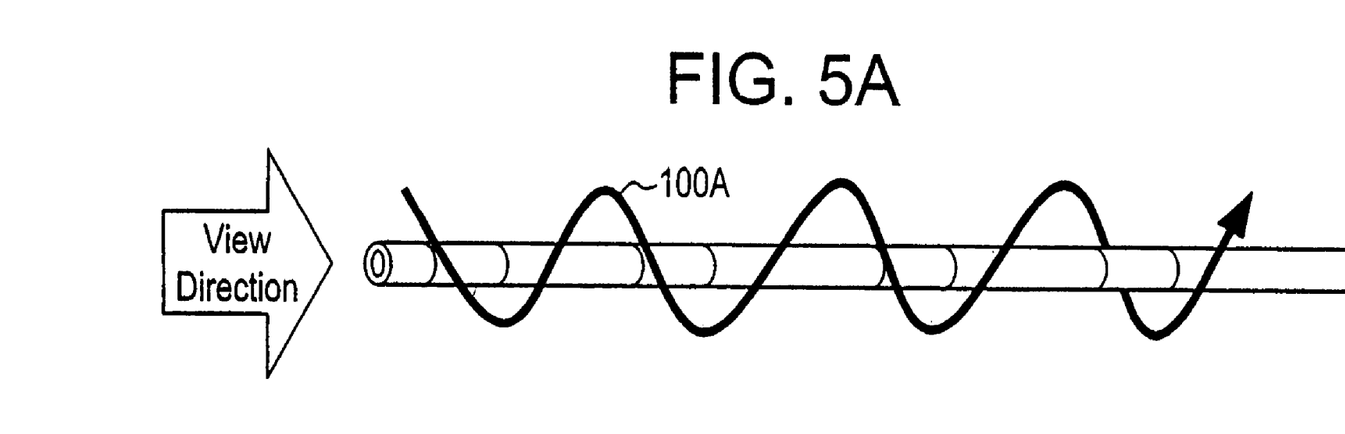
FIGS. 5A–5H disclose various separate embodiments of the fluid tubing or multi-lumen rope as in accordance with the present invention.
Figure 5B:
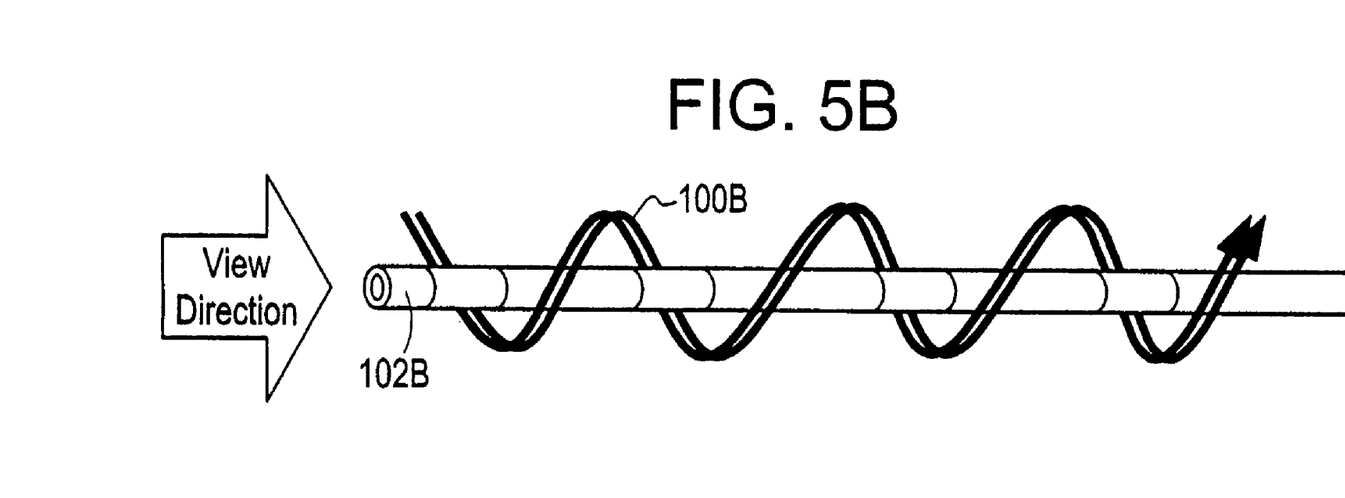
Figure 5C:
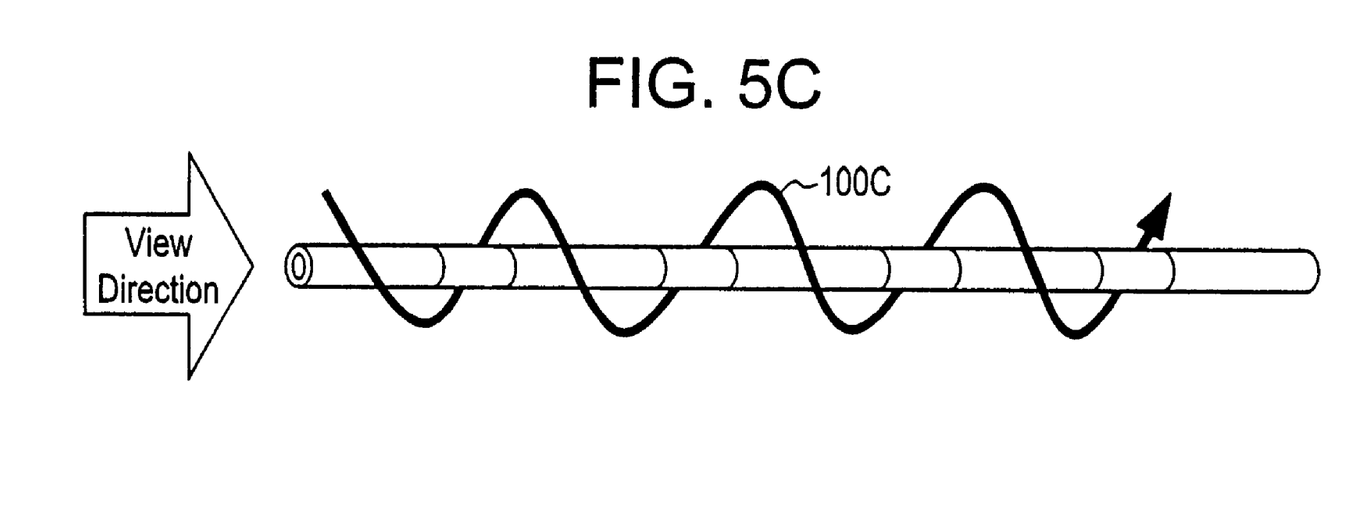
Figure 5D:
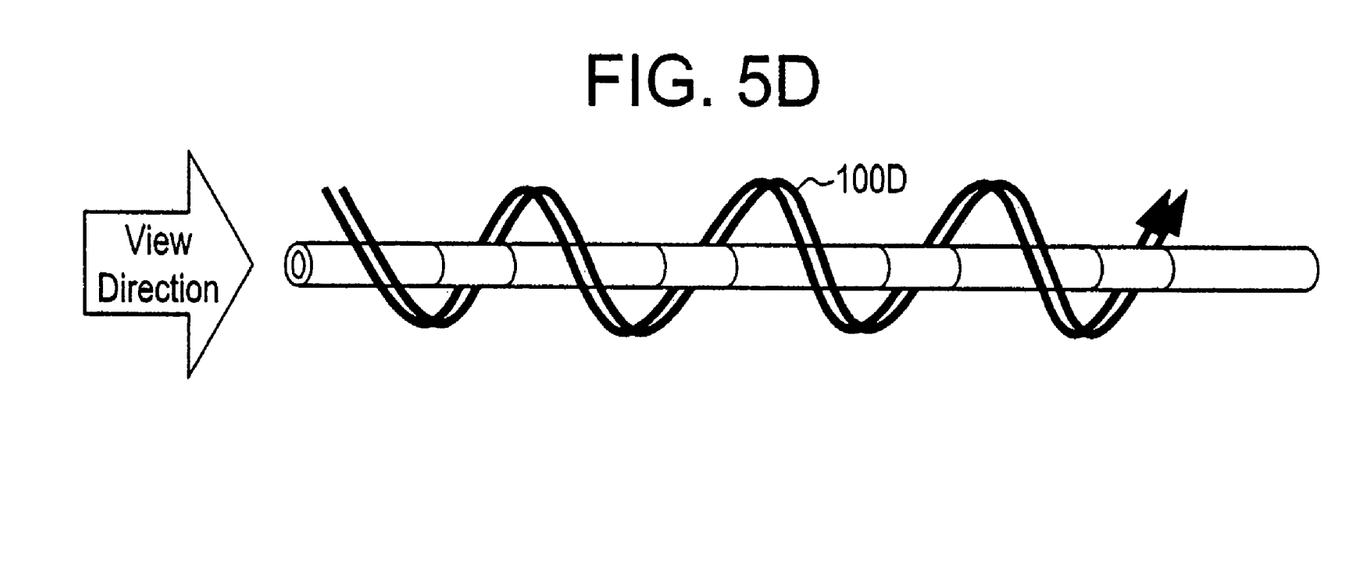
Figure 5E:
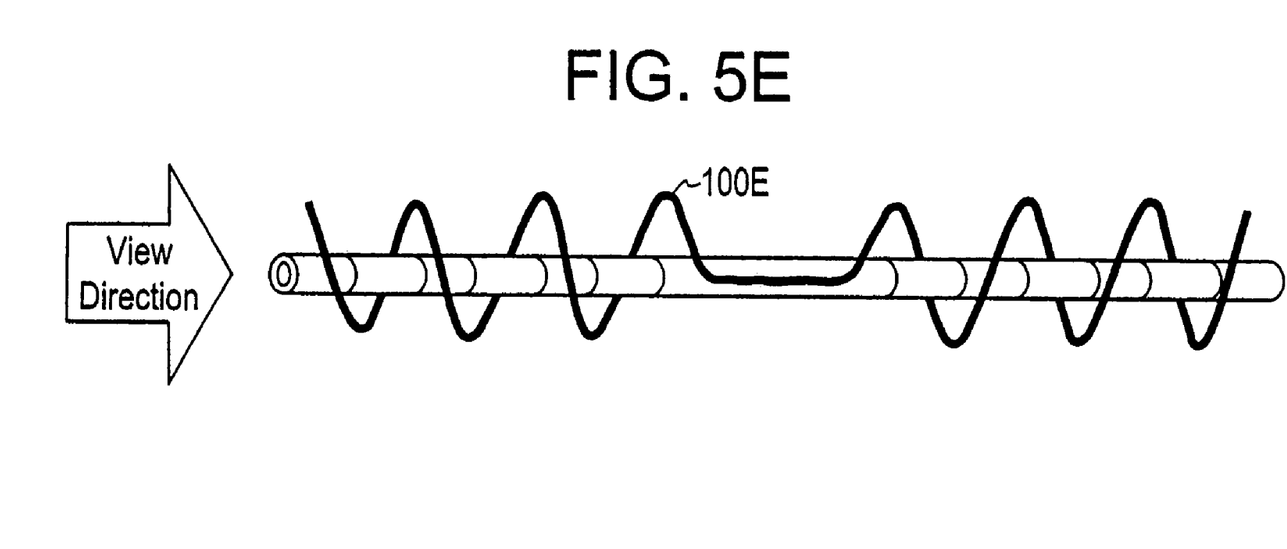
Figure 5F:
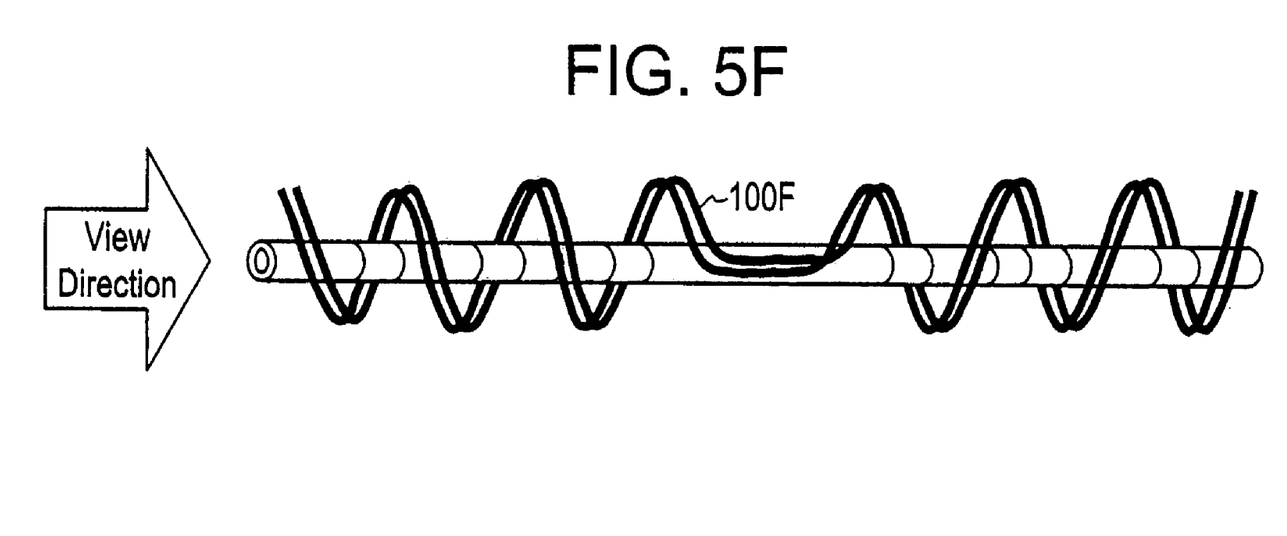
Figure 5G:
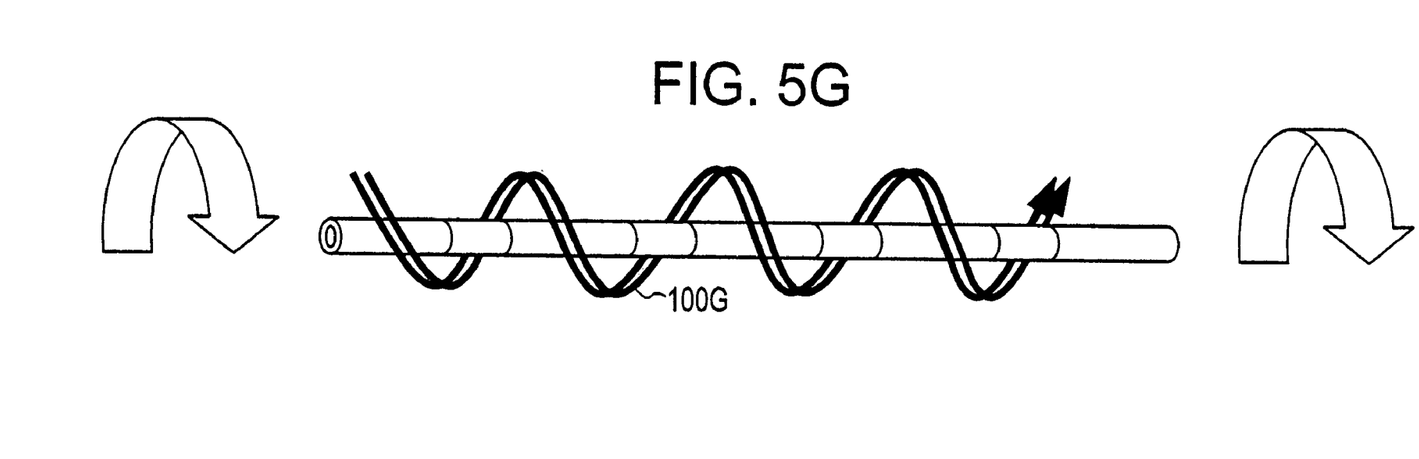
Figure 5H:
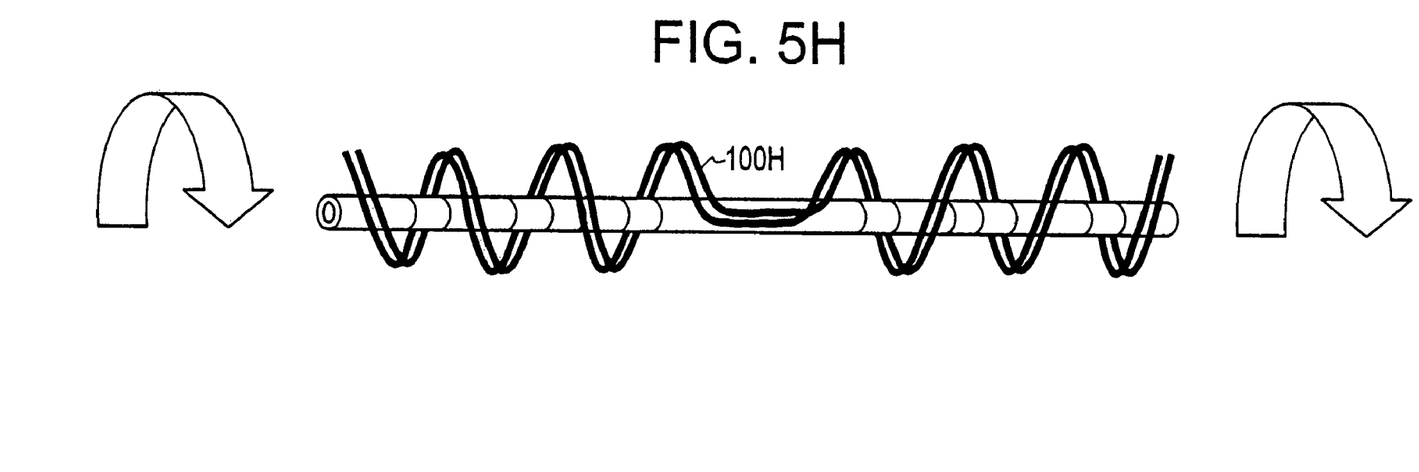

Reference is also now made to FIGS. 5A–5H for various designs of the rope. FIG. 5A shows a single strand 100A counterclockwise wrap while FIG. 5B shows a multi-strand 100B counterclockwise wrap. FIG. 5C shows a single strand 100C clockwise wrap, while FIG. 5D shows a multi-strand 100D clockwise wrap. Through testing and observation, it is found that the two ends of the skip rope behave asymmetrically. This is due to the fact that one end is twisting clockwise and the other end counterclockwise. One end tends to twist up while the other end untwists. Thus, it has been found that in accordance with one embodiment, during the rope fabrication, the twist direction may be reversed in mid-rope. In this regard, refer to FIGS. 5A, 5F and 5H. It is noted that a small section of the rope in the middle has no twist. By doing so, one may install the rope so that both ends see the same twisting condition. The rope may be installed so that both ends twist up to yield maximum torque stiffness so that both ends untwist to produce minimum restriction to fluid flow in the tubes.

In accordance with the present invention, in order to provide the desired low friction, relating to the fluid tubing, it is noted that portions of the skip rope progress through curved supports from the axis of rotation from the periphery where the rope is guided through very smooth, TEFLON (polytetrafliioroethylene), hard coated aluminum parts. Please refer to FIG. 3 and guide members 52 and 54. That in these areas, the co-efficient of friction between the skip rope and the guides is preferably less than 0.2.

The portion of the skip rope at the maximum radius from the center of rotation is a straight section of various lengths. This section can be very important to the overall torque needed to twist the rope. Indeed the weight of the skip rope assembly (plus fluids if it is filled) is increased by the G-field which may be a multiplier of 1,000 or more. To reduce the torque needed to drive the twisting motion, this section of skip rope is supported by the aforementioned support tube 80. This is preferably a stiff tube of either metal of structural plastic. The stiff tube is itself supported by the aforementioned low friction bearings 82 allowing full rotation about its own axis. This reduces the torque needed to drive this region of the skip rope assembly to very nearly zero. This structure of the support tube and bearings, provides an advantageous support for the length of fluid tubing or lumen between the guides 52 and 54. Because the support tube is free to rotate, upon rotation of the members such as 60 and 90 in FIG. 1, in other words first and second rotation mechanisms, the fluid tubing is free to either rotate with or rotate relative to the support tube.

Another characteristic of the present invention relates to the construction of the multi-lumen rope itself, as illustrated, for example, in FIG. 5B. This may be comprised of a plurality of at least eight lumens 100B about a center lumen 102B. The center lumen 102B is straight while the other peripheral lumens wrap, such as illustrated in FIG. 5B. The center lumen 102B may be an expresser tube while the lumens 100B may be processing tubes. Put another way, the tube 102B may be an input tubing and tubings 100B may be output tubings. The input and output tubings may be also reversed.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A multi-lumen rope comprising a plurality of elongated tubes for delivering one or more fluids between a first fluid containing mechanism and a fluid receiving rotatably driven rotor, one end of the rope being attached to the center of the driven rotor, the other end of the rope being attached to the first fluid retaining mechanism, the first fluid retaining mechanism being mounted on an opposing side of the rotor and such that the point of attachment of the other end of the rope is substantially coaxial with an axis of the rotor, said elongated tubes comprising at least one tube disposed in a spiral wrap, wherein one end of the rope has a right hand twist and the other end of the rope has a left hand twist.

2. A multi-lumen rope as set forth in claim 1, wherein said plurality of tubes include a center expresser tube and a plurality of peripheral processing tubes.

3. A multi-lumen rope as set forth in claim 2, wherein said spiral wrap is counterclockwise.

4. A multi-lumen rope as set forth in claim 2, wherein said spiral wrap is clockwise.

5. A multi-lumen rope as set forth in claim 1, wherein a section of the rope in the middle has no twist.

6. A multi-lumen rope as set forth in claim 1, wherein the rope is installed so that both ends twist up to yield maximum tortional stiffness.

7. A multi-lumen rope as set forth in claim 1, wherein the rope is installed so that both ends untwist to produce minimum restriction to fluid flow in the tubes.

* * * * *